Aug. 4, 1964 C. H. CURREY ETAL 3,143,705

SYSTEM FOR DETERMINING WHETHER LOCAL STATIONS ARE TRANSMITTING NETWORK PROGRAMS

Original Filed June 9, 1958 5 Sheets-Sheet 1

INVENTORS
CHARLES H. CURREY,
A.C. LEWIS BROWN,
DARREL W. HOLBROOK,
GORDON K. TRUESDALE AND
ROBERT L. FREEMAN

BY

ATTORNEYS

PROGRAM ANALYZER-44

United States Patent Office 3,143,705
Patented Aug. 4, 1964

3,143,705

SYSTEM FOR DETERMINING WHETHER LOCAL STATIONS ARE TRANSMITTING NETWORK PROGRAMS

Charles H. Currey, Palatine, Arthur C. Lewis Brown, Evanston, Darrel W. Holbrook, Glenview, Gordon K. Truesdale, Morton Grove, and Robert L. Freeman, Glenview, Ill., assignors to A. C. Nielson Company, a corporation of Delaware Original application June 9, 1958, Ser. No. 740,639, now Patent No. 3,070,798, dated Dec. 25, 1962. Divided and this application Feb. 19, 1962, Ser. No. 176,851
2 Claims. (Cl. 325—31)

Figure 1:
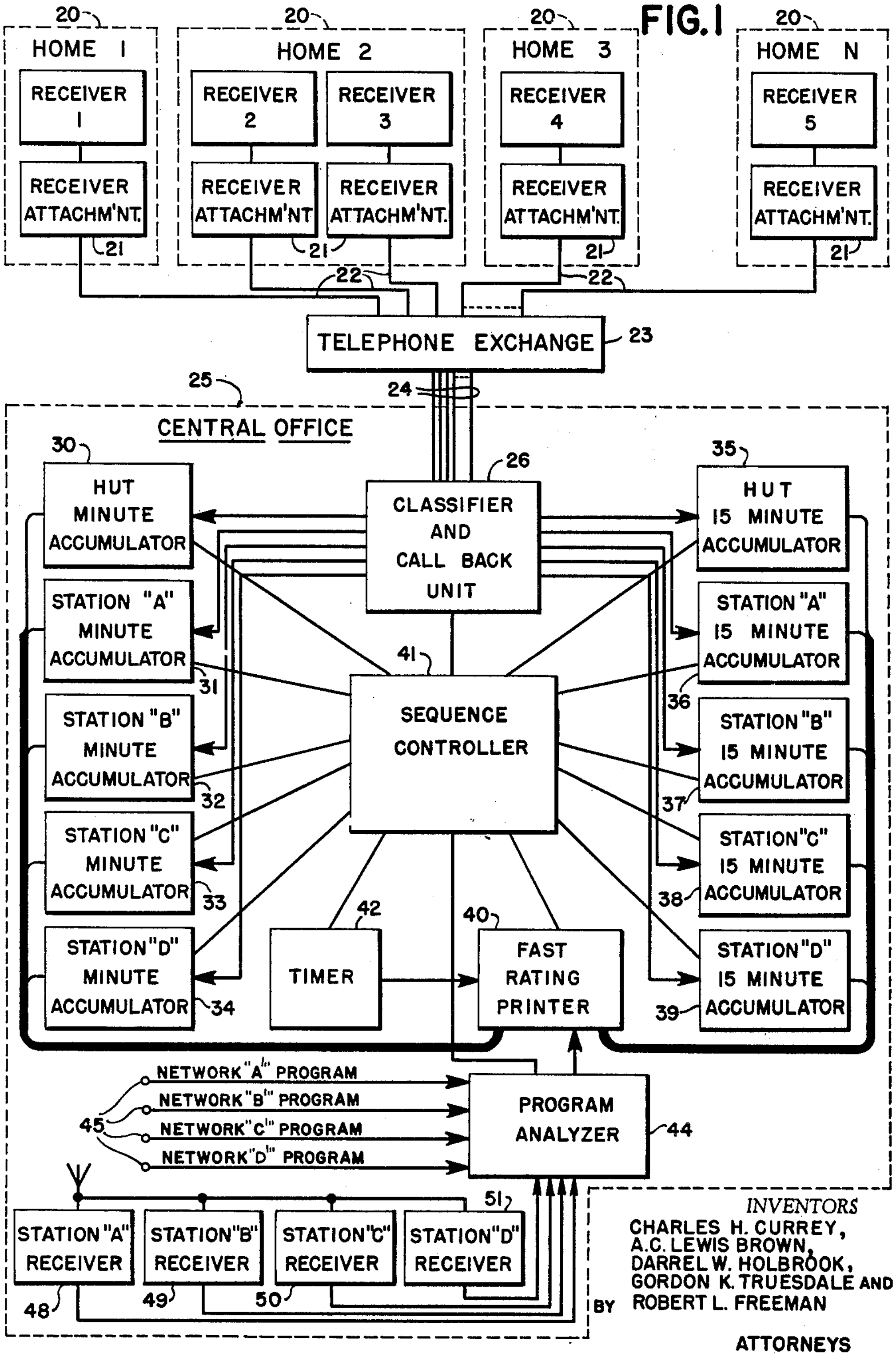

The present invention relates to wave signal receiver monitoring systems, and more particularly to an improved system for monitoring, from a remote location, a plurality of wave signal receivers to determine the extent of use of each receiver and, moreover, to determine the particular source from which program signals are received and translated by each receiver. In particular, therefore, the improved system of the present invention is well adapted for use in ascertaining the listening or viewing habits of wave signal receiver users.

This application is a division of Currey et al. application Serial No. 740,639, filed June 9, 1958, now United States Patent No. 3,070,798.

Generally speaking, the effectiveness of a particular program as an advertising media is directly related to the average size of the listening audience, the average period of listening to the program, i.e., the "holding power" of the program, and the variations in the size of the listening audience on a periodic basis. The periodic variations in the audience are indicative of the program components which cause audience gains or losses, the type of commercial messages which cause audience losses, and the optimum location of commercial messages during the program. In addition, it is desirable, in order to determine the effectiveness of a program as an advertising media, to obtain the following information or "ratings":

(1) *Cumulative audience*—The total number of different homes listening to one or more of four successive broadcasts of a weekly program.

(2) *Program duplication*—The extent to which programs of the same sponsor reach different audiences.

(3) *Audience flow*—The proportion of a programmed audience which was gained from people initially turning on or re-tuning their receivers from specified other programs.

(4) *Program audience by market positions*—A tabulation of the audience of specified programs in accordance with census groupings, such as, for example, geographic locations, family income, religion, etc.

Unless a very large staff or particularly complex and expensive calculating equipment is employed, considerable time is required to compute the above four ratings, and at best, approximately one week of monitoring is necessary. However, it is sometimes desirable to know the effectiveness of a particular program, or parts thereof, within a very short time after the termination of that program, and therefore, certain other information or ratings, while less detailed than the above factors, are both useful and necessary. These latter types of analytical information are generally known in the art as "fast ratings" and are usually expressed as percentages. These ratings for television monitoring, for example, are three in number and are as follows:

(1) Number of homes using TV.
(2) Average audience for a particular program.
(3) Share of audience for a particular program.

The first attempts to monitor home receivers utilized the so-called "telephone call method" which involves the making of hundreds of personal telephone calls to random selected homes during the period when a particular program of interest is in process and statistically analyzing the results of these telephone calls to determine the extent of listening. Although the information obtained by such a method is better than no information at all and can be used to compute the "fast ratings," because of the many inherent defects of this method, which defects include the uncontrolled uncertainties which are introduced by human judgment, the accuracy of the results so obtained tends to be destroyed. In fact, it is entirely impossible to obtain any useful information concerning most of the factors given above when the telephone-call method of monitoring is used.

Because both the networks and the sponsors of radio and television programs are desirous of obtaining accurate information as to the relative effectiveness of the programs with which they are associated, more accurate instrumented methods of sampling which do not require active audience collaboraiton have been necessarily resorted to so as to provide more information than is accumulated by the telephone-call sampling technique and, moreover, entirely to eliminate errors of human judgment associated with the personal contact types of sampling methods.

The instrumented methods or systems for monitoring receivers are in general of two types: the first utilizes a plurality of recorders, respectively located at a plurality of receivers to be monitored, and the second utilizes a single recorder remotely located with respect to the receivers to be monitored and to which information is automatically transmitted, either periodically or continuously, from each monitored receiver. The latter type system best lends itself to producing fast ratings which may be made available a short time after the termination of a program, and the present invention is concerned with such a system.

Network programs are ordinarily transmitted from network affiliated stations, but at certain times these affiliated stations replace the network programs with programs of purely local interest. Since the networks and sponsors of network programs are particularly desirous of knowing the extent of listening to network programs, it is necessary that the monitoring system compensate for changes in programming by the network affiliated stations so as to maintain the accuracy of the network program ratings. Moreover, for purposes of reliability and economy it is desirable that the system operate without manual attention, and therefore, the system should preferably include means for automatically determining when the network affiliated stations are not transmitting network programs.

In order to compute with the necessary degree of accuracy the above described factors and ratings from data collected from a group of homes comprising a sample, it is important to know how many active homes are in the sample, i.e., how many homes have monitoring equipment which is operative at the time of the survey. The number of active homes in the sample comprises what is known in the art as the "base count," and it is preferable in a continuous monitoring system of the type to which the present invention is directed to check, at least once each day, the monitoring equipment in each home to provide an accurate "base count" for each day.

A principal object of the present invention is to provide a new and improved method and apparatus for ascertaining the listening habits of wave signal receiver users.

Another object of the present invention is to provide a new and improved method and apparatus for monitoring the use of wave signal receivers.

Another object of the present invention is to provide a wave signal receiver monitoring system including means for determining when network programs are being transmitted by network affiliated stations.

Another object of the present invention is to provide a wave signal receiver monitoring system which provides accurate fast ratings for network programs.

Briefly, the above and further objects are realized by providing a monitoring system including a plurality of receiver attachments respectively associated with receivers to be monitored; scanning, accumulating and tabulating equipment located at a central office; and signal links connecting the receiver attachments to the equipment at the central office. In a preferred embodiment of the invention, the central office is also connected to sources of the network programs which are ordinarily transmitted by some or all of the local stations, and comparison means is provided at the central office for comparing the network programs with those programs actually receivable in the area, thereby to automatically determine whether the local transmitting stations are carrying network programs. The illustrated system embodying the present invention further includes means for periodically checking the operation of the receiver attachments and for providing a record of the number of such attachments which are operating properly.

Further objects and advantages of the present invention will become apparent as the following description proceeds, and the features of novelty which characterize the invention will be pointed out with particularity in the claims annexed to and forming a part of this specification.

Figure 2:
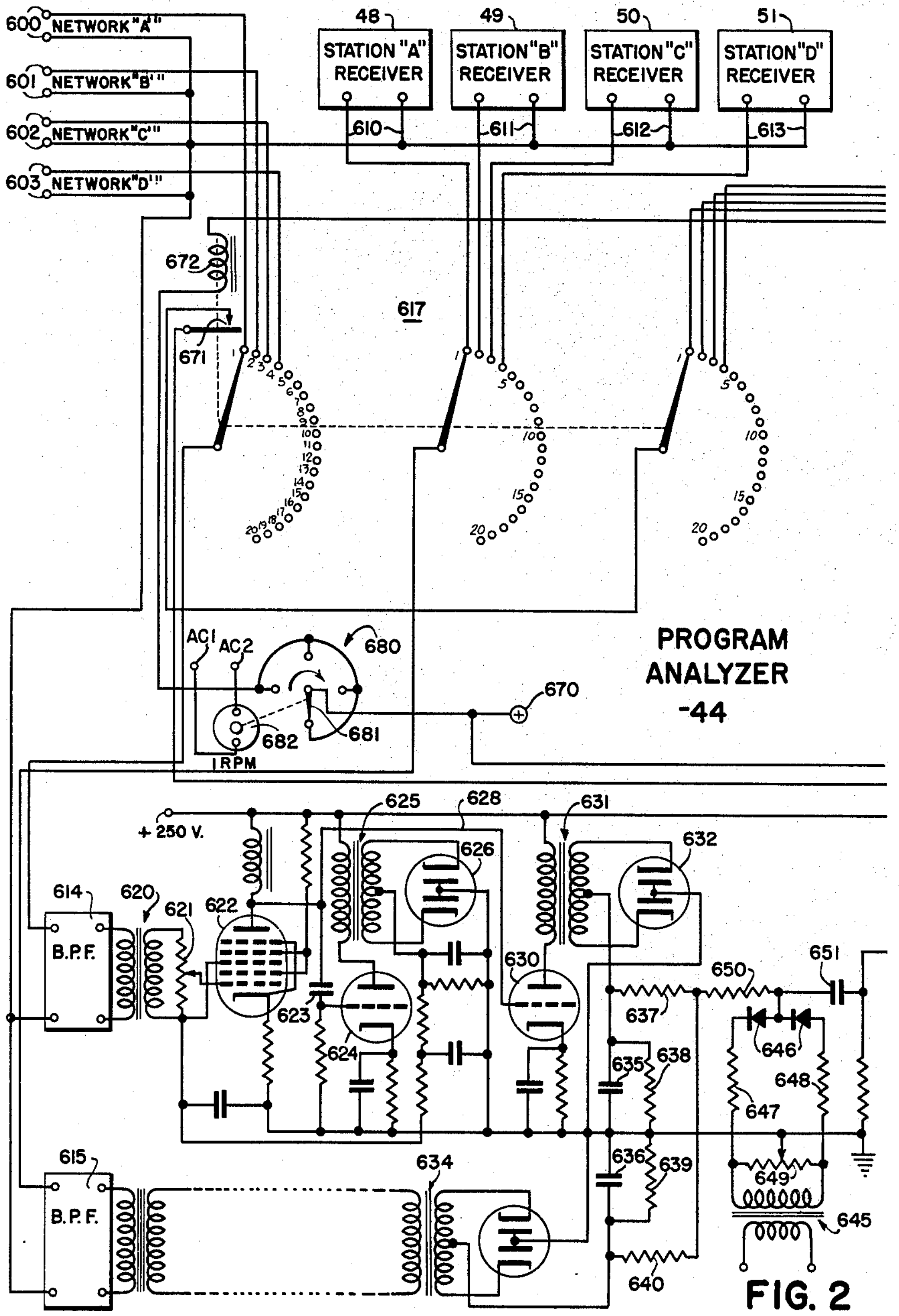
Figure 3:
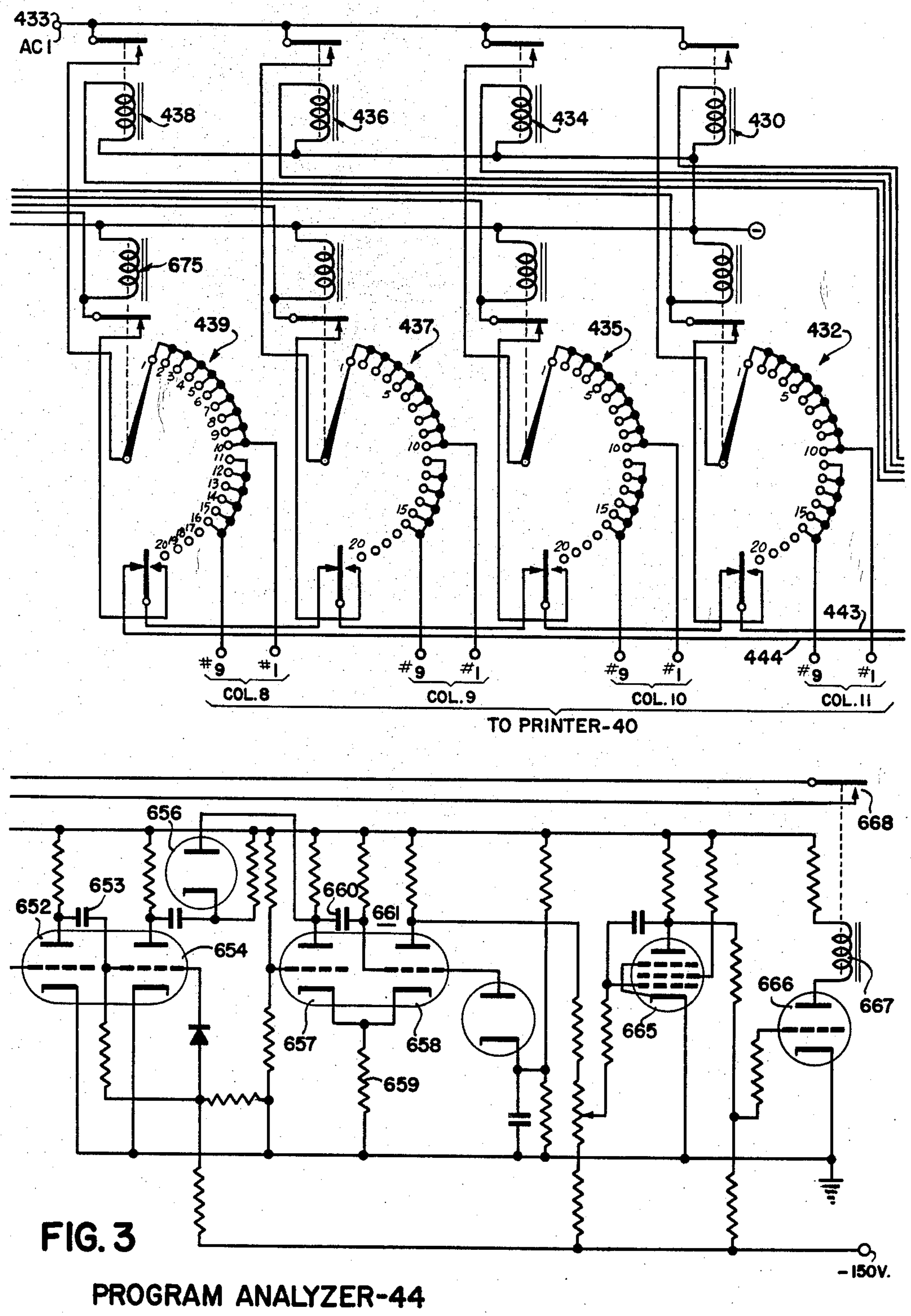
Figure 4:
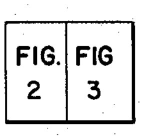
Figure 5:
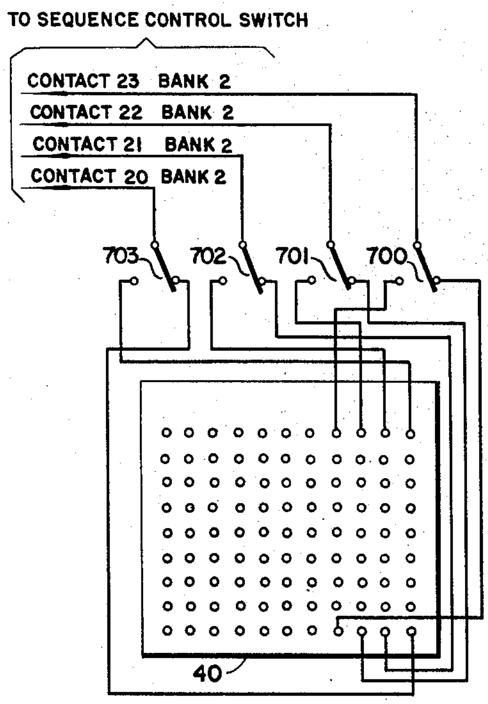
Figure 6:
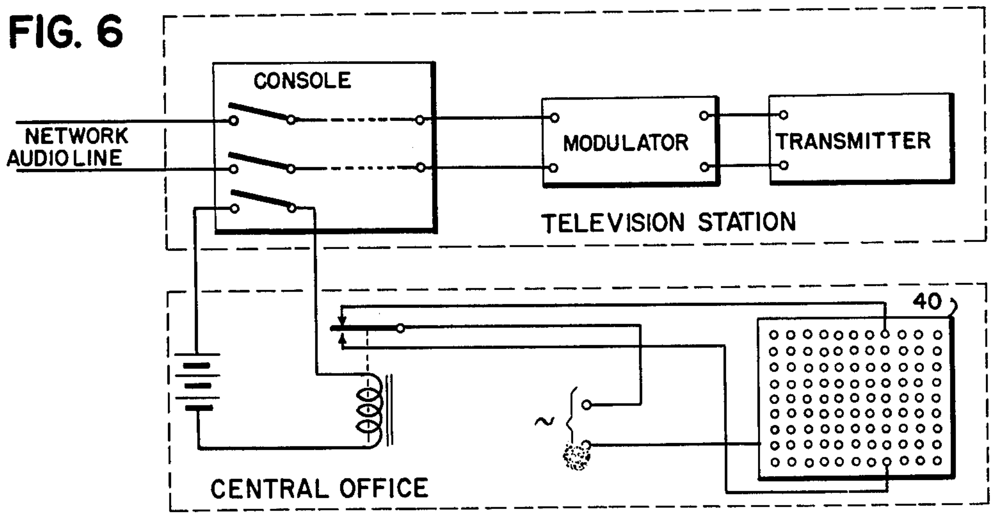
Figure 7:
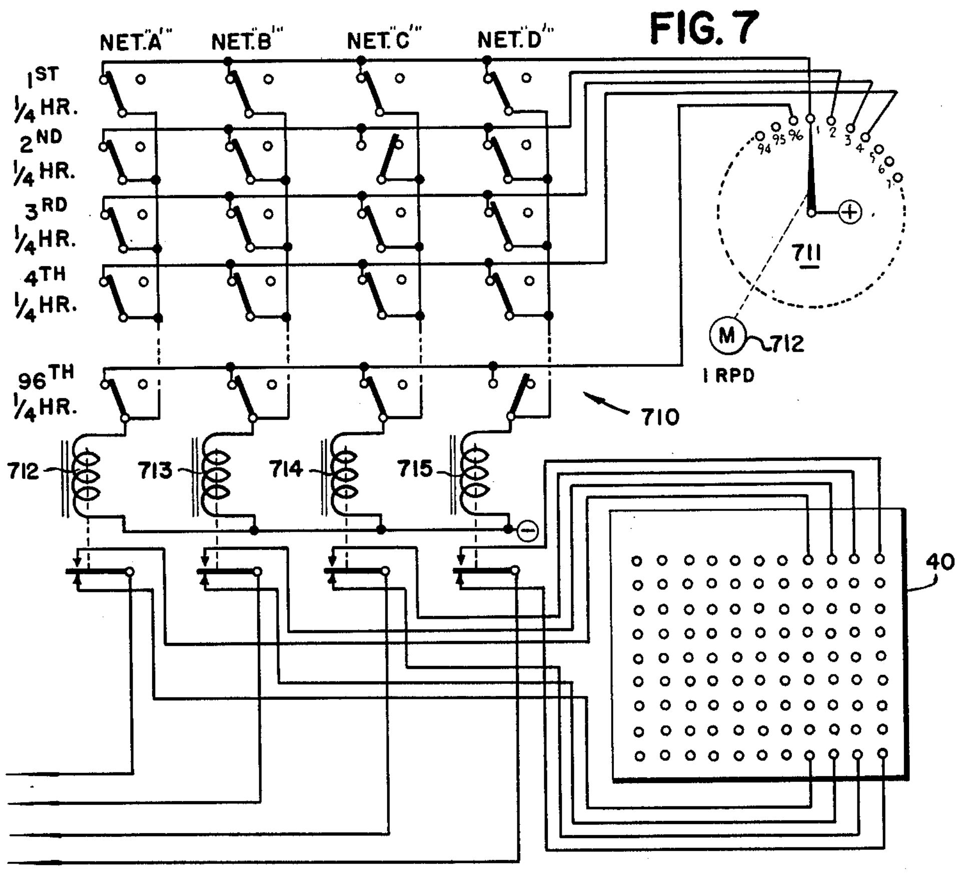

For a better understanding of the present invention, reference may be had to the accompanying drawings, in which:

FIG. 1 is a schematic illustration, in block diagram form, of a monitoring system embodying the present invention;

FIGS. 2 and 3 form a schematic diagram of a circuit for determining whether programming material actually transmitted by monitored stations is the same as network program material;

FIG. 4 is a block diagram showing the manner in which FIGS. 2 and 3 are positioned adjacent each other to form a complete circuit diagram; and FIGS. 5, 6 and 7 are alternative embodiments of the program analyzer used in the system of the present invention.

Referring now to the drawings, and particularly to FIG. 1 thereof, there is shown in block diagram form a wave signal receiver monitoring system embodying the present invention. This system provides up-to-the-minute "fast ratings" for four of the stations or programs receivable by the receivers connected in the system. In addition, this system provides fifteen-minute averages for each of the monitored programs to facilitate the rapid use of the fast ratings by the subscribers of the monitoring service, and it will be understood that the totals for other time periods, such, for example, as for five-minute periods or for any multiple thereof could be readily provided in accordance with the teachings of this invention. In order to facilitate an understanding of the present invention, it is described in connection with the monitoring of television receivers, but it will be understood that it is equally suited for monitoring the use of broadcast receivers, FM receivers, and the like.

In the system shown in FIG. 1, a plurality of receiver attachments 21 are respectively connected to the receivers in a plurality of homes 20, which have been selected in accordance with well-known techniques to provide a sample which is representative of all of the homes in the particular area being monitored. Each of the receiver attachments 21 is electrically connected to a respective one of a plurality of telephone line pairs 22. Preferably, the lines 22 are of the leased type and continuously connect the receiver attachments 21 through a telephone exchange 23 and respective ones of a plurality of telephone line pairs 24 to the central office 25. Inasmuch as many homes have more than one television receiver, certain ones of the homes in the sample will necessarily have more than one receiver. Accordingly, and as shown for purposes of illustration, the home No. 2 includes two such receivers, each of which has associated therewith a respective one of the receiver attachments 21 and separate ones of the telephone line pairs 22. There is thus provided in the system of the present invention one receiver attachment and one telephone connection to the central office 25 for each receiver in the sample irrespective of the number of receivers which may be located in any one home.

The receiver attachments 21 may be of any suitable type which provides an electrical output signal having a variable characteristic indicative of the operating condition of the associated receiver. However, the equipment at the central office 25 in the present system is designed for use with a receiver attachment of the type which provides an output signal having a magnitude indicative of the operating condition of the associated receiver, and the receiver attachments 21 are thus designed to provide continuous signals on the respective telephone line pairs 22 indicating the momentary operating conditions of the associated receivers. These operating condition indicating signals are thus transmitted via the usual telephone company equipment, including the lines 24, to the central office 25.

The system of the present invention employs different D.C. voltage levels for indicating the operating condition of the receivers in the sample. For example, for indicating the tuning condition of a receiver with respect to one of four stations and also to indicate unidentified listening, five D.C. voltage levels of, for example, 17, 26.2 volts, 36.4 volts, 49 and 70 volts might be employed. These voltages are respectively generated in the receiver attachments 21 and impressed on the associated leased telephone line pairs 22 for coupling to the central office.

Inasmuch as the operating condition signals are continuously transmitted to the central office 25, it is necessary that each of the lines 22 and 24 be of the "leased line" type since they are continuously used by the present system and no parts of the telephone connection can, therefore, be used on a time-sharing basis.

The telephone lines 24, which are connected between the telephone exchange 23 and the central office 25, terminate in a classifier and call-back unit 26 in the central office which analyzes the signals contained on each of the telephone line pairs 24 and selectively transmits to each of a plurality of minute accumulators 30, 31, 32, 33 and 34, and fifteen-minute accumulators 35, 36, 37, 38 and 39 signals which indicate the operating condition of the associated receivers. One-minute and one fifteen-minute accumulator are provided for each station being monitored, and in addition, one minute and one fifteen-minute accumulator are provided for the number of receivers using television (HUT). The classifier and call-back unit 26 includes a scanning means which periodically and selectively scans each of the pairs of telephone lines 24, and if the signal on the pair of telephone lines being scanned indicates that the associated receiver is energized, then signals are sent from the classifier to each of the HUT accumulators 30 and 35. Moreover, if the signal on the pair of telephone lines 24 being scanned also indicates that the particular receiver is tuned to receive the signals being transmitted from one of the stations A, B, C, or D, signals are transmitted from the unit 26 to corresponding ones of the minute accumulators 31–34 and fifteen-minute accumulators 36–39. If the associated receiver is energized but is not tuned to any of the stations A, B, C or D, the only signal sent from the classifier and call-back unit 26 is that which goes to the HUT accumulators 30 and 35. It is apparent that when this latter condition exists the associated receiver is tuned to some other station and the operation of the receiver would be classified as "unidentified listening".

Each of the telephone lines 24 are scanned once each minute in this manner and the accumulators 30–39 store the information which is thus supplied thereto for later transmittal to a recorder or printer 40. The accumulators 30–39 are counters which count up the number of receivers which were tuned to the respective stations, and at the end of each accumulation period, supply these accumulations in the form of signals to the fast rating printer 40. The minute accumulators supply the minute totals to the printer 40 which prints them once each minute while the fifteen-minute totals from the fifteen-minute accumulators are printed once each quarter hour. A timer 42 supplies calendar time indicating signals which are printed each minute by the printer 40. Control of the printing of these totals and time indices by the printer 40 is governed by a sequence controller 41. In addition, although not shown, the HUT and station totals may be connected to a visual, fast rating display unit which periodically indicates the number of homes which were using television, the number of homes which were tuned to station A, the number which were tuned to station B, the number which were tuned to station C, and the number of homes which were tuned to station D during a preceding time interval. The signals which are coupled from the classifier and call-back unit 26 to the fifteen-minute accumulators 35–39 and accumulated throughout a full fifteen-minute period to provide the fifteen-minute totals are printed by the fast rating printer 40 during the fifteenth minute of each quarter hour immediately following the printing of the minute totals for the fifteenth minute.

In addition to the fifteenth minute totals and the fifteen-minute totals, the printer 40 prints during the fifteenth minute of each quarter hour information indicative of whether or not stations A, B, C and D were respectively carrying network programs during the preceding quarter hour.

In order to determine and supply this "program source" information to the printer 40, there is provided a program analyzer 44 which supplies to the printer 40, through the controller 41, signals which indicate whether the stations A, B, C and D were respectively carrying network programs during each preceding quarter hour. The program analyzer 44 is, in effect, a comparision device to which the network programs are supplied via a plurality of lines 45 and to which are supplied signals received by a plurality of receivers 48, 49, 50 and 51 which are tuned to receive the signals being transmitted from stations A, B, C and D. If the signals respectively supplied from the receivers 48, 49, 50 and 51 are the same as those supplied from the respective network program sources via the lines 45, the signals supplied at fifteen-minute intervals to the printer 40 from the program analyzer 44 indicate that the stations A, B, C and D carried network programs, but in the event that the signals compared by the unit 44 differ, this information is also relayed to the printer 40 which thus prints an indication that the stations in question did not carry network programs.

In order to compute the various program ratings from the information thus recorded by the printer 40, it is necessary to know the number of homes in the sample which have properly functioning receiver attachments 21. Experience has shown that the number of properly functioning home units may vary up to 10%, and as a result, if this variation in base count is not taken into account, large errors will frequently be introduced into the ratings. Accordingly, in accordance with an important feature of the present invention, the monitoring system includes means for periodically testing the operation of the equipment connected between each of the homes in the sample and the central office. Preferably, this check of the operation of the individual home units is carried out once each day and then during a time when it is very unlikely that any receiver listening will take place. Therefore, once each day in the very early hours of the morning the sequence controller 41 alters the mode of operation of the classifier and call-back unit 26 so that call-back initiating signals are sent out from the central office 25 to the receiver attachments 21. Upon receipt of the call-back signals, each receiver attachment 21 answers back in a prearranged manner which indicates if it is functioning properly in all respects. If any of the attachments 21 are not functioning properly, the base count for the day is modified and supplied through the sequence controller 41 to the printer 40 and recorded at this time. This base count check via recall actually serves two important functions. In addition to providing an accurate indication of the base count of the sample, it also enables an automatic determination of which of the receiver attachments 21 are out of order so that maintenance personnel may immediately go to the homes in question and repair the inoperative units.

In the system of the present invention, during each fifteen minutes of the day, there is printed, in addition to the usual time identification data and the HUT and station identification data, four figures which respectively indicate whether or not the four stations being monitored were carrying network programs during the preceding quarter hour. The four digits respectively relate to the four stations being monitored. A one indicates that the station was not carrying a network program, and a nine indicates that the station was carrying a network program.

As shown in FIG. 2, the switches 432, 435, 437 and 439 are identically wired, and the first ten contacts of each are connected together and to the number one terminal of one of the digit columns of the printer, and the eleventh through sixteenth contacts are connected together and to the ninth terminal of the same digit column of the printer. Once each minute the audio portion of the signal being transmitted by station A is compared with the audio signal which is being supplied to all of the corresponding network stations, and if the two audio signals are alike the switch 439 is stepped one position. Otherwise, the switch 439 is not stepped. Similarly, the audio components of the signals transmitted by stations B, C and D are compared once each minute with the audio signals of the corresponding networks B, C and D, and the switches 432, 435 and 437 are respectively stepped in the event the signals compared are alike.

It has been found that even though a station may be carrying the network program, there may be some local information periodically transmitted such, for example, as station identification signals, local advertising breaks, special news broadcasts, and the like. Consequently, even though a station may be carrying a network program, the transmitted signal and the network signal may differ throughout a substantial portion of each quarter hour. However, if a match occurs during ten of the fifteen minutes, then it is clear that the network program was carried and, for practical purposes, the station is considered to have been carrying the network program during the preceding fifteen-minute time interval. Had a match occurred for at least ten minutes during any quarter hour interval, the wiper of the switch 432, 435, 437, 439 corresponding to the station in question would be at least on the eleventh or tenth off-normal contact position at the end of the quarter hour in question and, therefore, would energize the ninth terminal of the associated digit column of the printer thereby to print on the fast rating record an indication that the station was carrying a network program. On the other hand, if the wiper has not moved to at least the tenth off-normal contact position, then a considerable amount of time during the preceding fifteen-minute interval was devoted to a locally produced program and the number one terminal of the same digit column would be energized thereby to indicate that the station was not carrying a network program during the preceding quarter hour.

Considering the circuitry of the present invention which once each minute compares the network programs with the locally transmitted programs to determine if they are the same, and which thus supplies the necessary stepping voltages to the switches 432, 435, 437 and 439 when the stations in question are carrying network programs, the audio portions of the network programs from networks A′, B′, C′ and D′, which are adapted to be carried by the local stations A, B, C and D, are respectively supplied to the central office via a plurality of line pairs 600, 601, 602 and 603. Similarly, a plurality of receivers 48, 49, 50, and 51 are provided for respectively receiving the signals which are actually transmitted by the stations A, B, C and D, and for applying the audio portions of these signals across respective sets of liners 610, 611, 612 and 613. The common ones of each of the line pairs 600–603 and 610–613 are connected together and to the common terminals of a pair of conventional bandpass filters 614 and 615. The filters 614 and 615 are conventional one-thousand cycle per second bandpass filters centered at one thousand cycles per second and having a bandwidth of approximately 150 cycles and an attenuation slope of approximately 40 db/octave. The other conductors of the line pairs 600–603 are respectively connected to the first four contact segments of the first switch bank of a stepping switch 617. The other conductors of the line pairs 610–613 are similarly connected to the first four contact segments of the second bank of the switch 617. The wiper of the first bank of the switch 617 is connected to the input of the bandpass filter 614, and the wiper of the second bank of the switch 617 is connected to the input of the bandpass filter 615. With the switch 617 in the first contact position, as shown, whereby the program actually being transmitted by station A is compared with the program being carried by network A′, the network A′ signal which is received on line 600 is coupled through the first bank of switch 617 to the bandpass filter 614. The output of the filter 614 is coupled via a transformer 620 to a potentiometer 621 from which it is coupled to a set of signal grids on a tube 622 which is connected in an amplification and compression circuit for amplifying and compressing the signals which are supplied thereto. The resulting signal is coupled through a capacitor 623 to the signal grid of a triode amplifier 624, the output of which is coupled through a transformer 625 to a full-wave rectifier circuit including a double diode 626 from the output of which a rectified voltage signal is returned to provide a bias on the input grid for the amplifier tube 622. In this manner, the audio network A′ signal which is coupled through the transformer 620 is amplified and compressed so that level changes of 60db at the input are compressed to 12db at the output of the amplifier 622.

A portion of the output of the amplifier 622 is coupled via a conductor 628 to the signal grid of a triode amplifier 630, the output of which is coupled through a transformer 631 to a full-wave rectifier network including a double diode 632. The circuits comprising the tubes 622, 624, 626, 630 and 632 thus provide amplification, compression and integration to provide at the center tap of the secondary winding of the transformer 631 a rectified A.C. signal which has a value varying in accordance with the audio signal appearing between the lines 600. A similar circuit is provided at the output of the bandpass filter 615 so as to provide at the center tap of an output transformer 634 thereof a similar full-wave rectified D.C. signal which varies in accordance with the audio component of the signal appearing at the output of the A station receiver 605.

The amplifier, the compression and integration circuit which extends from the input transformer 620 to the output transformer 631 and the identical circuit which is provided at the output of the bandpass filter 615 is substantially the same as that disclosed in FIG. 2 of a copending application, Serial No. 624,359, filed November 26, 1956, by Chauncey Richard Evans, now United States Patent No. 2,958,766. A detailed analysis of the operation of this circuit is given in that application. However, for a complete understanding of the present invention it is only necessary to understand that when identical audio signals are supplied to the bandpass filters 614 and 615 the output signals appearing at the center taps of the secondary windings of the transformer 631 and 634 are identical, but opposite in polarity, while these signals are entirely different if different program signals are supplied to the filters 614 and 615. These signals are added together in the network comprising the capacitors 635 and 636 and the resistors 637, 638, 639 and 640 to provide at the junction of the resistors 637 and 640 a signal voltage which is substantially zero when the signals are identical but which has a relatively large value if the input signals to the filters 614 and 615 are not identical.

In order to convert this rectified voltage signal to an A.C. voltage, the 60-cycle power line is connected to the primary winding of a transformer 645 having a pair of rectifiers 646 connected back-to-back in series with a pair of resistors 647 and 648 across the secondary winding thereof. A balancing potentiometer 649 is also connected across this secondary winding and an adjustable tap thereon is connected to ground. The signal appearing at the junction of the resistors 637 and 640 is thus coupled through a resistor 650 and chopped by the diodes 646 to provide a 60-cycle signal having an amplitude corresponding to that of the sum of the voltages from the transformers 631 and 634. This A.C. voltage, which is a square wave, is coupled through a capacitor 651 to the control grid of a triode clipper 652, wherein it is clipped in a negative direction. The positive going voltage pulses are then coupled through a capacitor 653 to a second triode amplifier 654 wherein the signal is further amplified and coupled by means of a diode 656 to a monostable flip-flop circuit 661 comprising a pair of triodes 657 and 658. The flip-flop circuit 661 is conventional having a common cathode resistor 659 and a capacitor 660 connecting the anode of one triode to the control grid of the other. The output of the flip-flop circuit 661 is, therefore, a positive pulse which is coupled from the anode of the triode 658 to the signal grid of a pentode 665 which is part of a Miller integrator circuit having a time constant of approximately seven seconds such that match indications for short intervals of less than seven seconds are 100% integrated out. The integrated output signal from the Miller integrator is supplied to the signal grid of an amplifier 666 having a relay 667 connected to the anode circuit thereof. Accordingly, the relay 667 is operated whenever a match occurs. As shown, the relay 667 includes a set of normally open contacts 668 which are connected between a positive voltage terminal 670 and a set of normally open contacts 671 on the stepping solenoid 672 of the switch 617. The solenoid 672 is energized at this time in a manner to be described hereinafter whereby the contacts 671 are closed and thus couple the positive battery voltage from the terminal 670 to the wiper of the third bank of the switch 617 from which it is connected to the stepping solenoid 675 of the A station stepping switch 439. The switch 439 thus steps one contact position during each minute that a match occurs.

In order to check each of the four stations being monitored, there is provided a rotary type switch 680 having a wiper 681 driven by a 1 r.p.m. motor 682. The contacts of the switch 680 are all connected together and to the positive voltage side of the stepping solenoid 672 for the switch 617. The wiper 681 is connected to the positive voltage terminal 670 so that each time the wiper 681 steps between contact positions the voltage to the solenoid 682 is interrupted thereby permitting the switch 617 to step. When the wiper 681 engages the next contact segment, the voltage from the terminal 670 is again coupled to the solenoid 672 thereby to energize it and maintain the contacts 671 closed. The motor 682 is connected directly across the A.C. power lines and continues to operate throughout the day so that once each minute all four of the stations are checked to determine if they are carrying the network programs and to automatically print this information in conjunction with the fast ratings.

It is not necessary to phase the switches 617, 432, 435, 437 and 439 with the sequence control switch since the present system shows a match when there is ten minutes of match out of a total of fifteen minutes during each quarter hour.

While the circuit of FIGS. 2 and 3 automatically provides a record for every quarter hour as to whether or not the stations being monitored were carrying network programs, other means may be provided for supplying this information to the printer.

Referring now to FIG. 5, there is shown a considerably simpler, manually operated switching network for supplying the program source information to the printer. In this arrangement a plurality of single pole, double-throw switches 700, 701, 702 and 703 replace the station A, B, C and D switches 439, 437, 435 and 432, and an operator replaces the comparison circuit portion of the audio matching system shown in FIGS. 3 and 4. In the circuit of FIG. 5, the four input lines to the switches and their associated components 432, 435, 437 and 439 from the sequence controller are respectively connected to the common poles of the switches 700, 701, 702 and 703, and the two output terminals to which each of the armatures may be thrown are respectively connected to the ninth and first terminals of respective ones of the last four digit columns of the printer. An operator for station A, for example, listens or watches the program which is being transmitted by the local station A, and also watches the program which is being piped in from the network A′, and if the two programs are identical, he then actuates the switch corresponding to the station in question to the position shown so that when the sequence controller supplies the signal to the input line thereof it is supplied to the ninth terminal of the digit column in question. Similarly, the same or other operators will observe the other three stations and operate the switches 701, 702 and 703. Therefore, at the end of every quarter hour period when the four input lines to the circuit of FIG. 5 are sequentially energized by the switch 315, either the first or the ninth input terminals of the station and network match digits of the printer 40 will be energized for future printing of the program source information when the switch 315 steps to the twenty-fourth off-normal contact positions.

Another means for providing the program source information is to cause the switches 700, 701, 702 and 703 to be operated by respective electromagnetic windings whereby the switches 700–703 comprise contacts on four individual relays. The coils of these relays are serially connected to respective pairs of telegraph lines which are connected in a loop which further includes respective switches at the corresponding transmitter which are automatically closed when the switching equipment at the transmitter is actuated to couple the network program to the input stage of the transmitter. Referring to FIG. 6, there is shown a circuit for effecting this result. The circuit of FIG. 6 is a very simplified version of how the telegraph line would be completed during the transmission of a network program, and it will be understood that different stations may have different switching arrangements including multiple switching networks so that various types of switching arrangements may be necessary to complete the telegraph line circuit when, and only when, the station is carrying a network program. However, FIG. 6 is merely schematic and illustrates the manner in which those skilled in the art may employ the present invention to automatically provide at the central office information indicative of whether or not the local station is carrying a network program. Moreover, the circuit of FIG. 6 shows how this information may be automatically supplied to the fast rating printer, and it will be understood that a similar circuit will be provided for each network affiliated station being monitored.

Referring to FIG. 7, there is shown still another alternative arrangement for supplying the program source information to the printer 40. In the circuit of FIG. 7, there is provided a matrix of manually operated switches 710 which are arranged in rows and columns. For example, the first row of switches are connected from a common conductor which is connected to the first contact of a ninety-six position stepping switch 711 which is driven by a motor at one revolution per day, and the wiper of the switch 711 is connected to a positive voltage terminal. The common contacts of all of the switches in each column are respectively connected to the coils of four relays 712, 713, 714 and 715, each having normally open and normally closed contacts which are connected respectively to the first and ninth terminals of four digit columns of the printer 40. The relays 712–714 thus have C-spring type contacts, and the four common contact members thereof are respectively connected to the twentieth through twenty-third contacts of the switch 315. The common contact members of the relays 712–715 are thus selectively energized at the end of each quarter hour to record whether or not the local stations were carrying network programs during the preceding quarter hour. The switches in the matrix 710 are manually positioned at the beginning of each day in accordance with the program information supplied to the central office from the local station. Therefore, for example, if station A were scheduled to carry a non-network program during the first quarter hour of the day, the switch which is in the first row of the first column of the matrix 710 would be positioned as shown, while if a network program were to be carried at that time this switch would be thrown to the other position. When this switch is in the non-network position, and it is the first quarter hour of the day, a positive voltage is supplied through the switch 711 and through the matrix bank 710 to the coil of the relay 712 thereby to energize it to close the normally open contacts thereof and connect the input conductor from the twenty-third contact of the second bank of the switch 315 to the first terminal of the eighth digit column of the printer 40. However, had this switch been in the other position, the network position, the relay 712 would not have been operated and, therefore, the signal voltage from the relay 712 would be connected to the ninth terminal of the eighth digit column of the printer 40 and a numeral nine would be printed when the printer 40 were energized.

That aspect of the present invention which concerns the recording of station acceptance data, i.e., whether the individual stations are broadcasting network programs, has been described as embodied in a particular monitoring system. However, this aspect of the invention may be used with other systems or in different arrangements in the illustrated system. For example, where network program listing is of particular interest, the output of the program analyzer 44 may be connected through the sequence controller 41 to the fast rating printer 40 so that the network program totals and the percentage of persons listening to all other programs are respectively printed. Moreover, this aspect of the invention may be used in a monitoring system where the listening information is stored in the receiver attachments and transmitted at periodic intervals to a central office. In the latter system the station acceptance information is, of course, needed at the central office when the ratings are computed, and it may be so provided by any of the devices disclosed hereinbefore for determining program acceptance.

While particular embodiments of the invention have been shown, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. In a system for determining the listening habits of wave signal receiver users, first means for supplying a network signal representing at least a portion of a network program, second means for supplying a station signal representing at least a portion of a signal transmitted by a transmitting station, comparing means for comparing the signals supplied by the first and second means to determine whether the network signal is the same as the station signal, means for operating the comparing means a plurality of times within a given time interval, and indicating means controlled by the comparing means for providing an indication only when the comparing means determines that the network signal is the same as the station signal a given number of times greater than one during the given time interval.

2. In a system for determining the listening habits of wave signal receiver users, first means for supplying a network signal representing at least a portion of a network program, second means for supplying a station signal representing at least a portion of a signal transmitted by a transmitting station, comparing means for comparing the signals supplied by the first and second means to determine whether the network signal is the same as the station signal, means for operating the comparing means a plurality of times within a given time interval, counting means controlled by the comparing means for establishing the total number of times that the network signal is the same as the station signal within the given time interval, and detecting means controlled by the counting means and operative to provide an indication of whether the station was transmitting the same signals as the network in dependence on the number of times that the comparing means determines that the station signals and the network signals are the same within the given time interval.

References Cited in the file of this patent

UNITED STATES PATENTS

| | | |
|---|---|---|
| 2,410,669 | Lynn | Nov. 5, 1946 |
| 2,432,944 | Shillington | Dec. 16, 1947 |
| 2,630,366 | Rahmel | Mar. 3, 1953 |
| 2,716,702 | Reynolds | Aug. 30, 1955 |
| 2,861,176 | Horn et al. | Nov. 18, 1958 |
| 2,947,858 | Abbott | Aug. 2, 1960 |
| 2,958,766 | Evans | Nov. 1, 1960 |
| 3,058,055 | Muller et al. | Oct. 9, 1962 |
| 3,058,065 | Freeman et al. | Oct. 9, 1962 |